United States Patent
Anderson (10) Patent No.: US 11,389,746 B2
(45) Date of Patent: Jul. 19, 2022

(54) EXTRACTOR ARRANGEMENT FOR PROCESSING MATERIALS WITH FINES

(71) Applicant: Crown Iron Works Company, Roseville, MN (US)

(72) Inventor: George E. Anderson, Champlin, MN (US)

(73) Assignee: Crown Iron Works Company, Blaine, MN (US)

( * ) Notice: Subject to any disclaimer, the term of this patent is extended or adjusted under 35 U.S.C. 154(b) by 0 days.

(21) Appl. No.: 15/750,634

(22) PCT Filed: Aug. 19, 2016

(86) PCT No.: PCT/US2016/047861
§ 371 (c)(1),
(2) Date: Feb. 6, 2018

(87) PCT Pub. No.: WO2017/035012
PCT Pub. Date: Mar. 2, 2017

(65) Prior Publication Data
US 2018/0296940 A1    Oct. 18, 2018

Related U.S. Application Data

(60) Provisional application No. 62/208,370, filed on Aug. 21, 2015.

(51) Int. Cl.
*B01D 11/02* (2006.01)
*C11B 1/10* (2006.01)

(52) U.S. Cl.
CPC ........ *B01D 11/023* (2013.01); *B01D 11/0284* (2013.01); *C11B 1/10* (2013.01)

(58) Field of Classification Search
CPC ...... B01D 11/023; B01D 11/0284; C11B 1/10
See application file for complete search history.

(56) References Cited

U.S. PATENT DOCUMENTS 3,966,982 A * 6/1976 Becker .................... A23J 1/142
426/430
4,375,264 A    3/1983 Porter
(Continued)

FOREIGN PATENT DOCUMENTS

CN    1972892 A    5/2007
CN    102851113 A    1/2013
(Continued)

OTHER PUBLICATIONS

International Patent Application No. PCT/US2016/047861, International Search Report and Written Opinion dated Nov. 29, 2016, 14 pages.
(Continued)

*Primary Examiner* — Sean E Conley
*Assistant Examiner* — Brendan A Hensel
(74) *Attorney, Agent, or Firm* — Fredrikson & Byron, P.A.

(57) ABSTRACT

An extraction system may include a primary extractor that is configured to process a main feedstock undergoing extraction and a secondary extractor configured to process particulate matter separated from miscella produced on the primary extractor. In some configurations, the secondary extractor is an immersion extractor that has a solvent stream flowing in a counter current direction to a direction which the particulate matter flows through the extractor. In operation, the primary extractor can generate a miscella stream containing solvent and components extracted from the feedstock being processed by the extractor. Following separation in which the miscella stream is processed to remove particulate matter, the particulate matter may be charged to the secondary extractor as a feedstock for the secondary extractor. In some examples, the miscella from the primary and secondary extractors are combined and/or the discharged
(Continued)

feedstock from the primary and secondary extractors are combined for subsequent processing.

16 Claims, 4 Drawing Sheets

(56) References Cited

U.S. PATENT DOCUMENTS

| | | | |
|---|---|---|---|
| 4,751,060 | A | 6/1988 | Kratochwill |
| 5,408,924 | A | 4/1995 | Arendt et al. |
| 5,591,416 | A | 1/1997 | Kemper et al. |
| 5,770,082 | A * | 6/1998 | Anderson ............ B01D 11/023 210/511 |
| 10,245,526 | B2 * | 4/2019 | White ................. B01D 11/023 |
| 2006/0199969 | A1 * | 9/2006 | Neumuller ............... A23J 1/14 554/8 |
| 2008/0118626 | A1 | 5/2008 | McWilliams et al. |
| 2014/0193303 | A1 | 7/2014 | Ellis et al. |

FOREIGN PATENT DOCUMENTS

| | | |
|---|---|---|
| CN | 203060886 U | 7/2013 |
| CN | 104474735 A | 4/2015 |
| WO | 2005100518 A1 | 10/2005 |
| WO | 2006102685 A1 | 9/2006 |
| WO | WO 2006/102685 * | 9/2006 ............... C11B 1/10 |
| WO | WO-2006102685 A1 * | 9/2006 ............... C11B 1/06 |
| WO | 2009041929 A1 | 4/2009 |
| WO | 2010059919 A2 | 5/2010 |
| WO | 2013159024 A1 | 10/2013 |
| WO | 2015179530 A1 | 11/2015 |
| WO | 2017027381 A1 | 2/2017 |
| WO | 2017027415 A1 | 2/2017 |
| WO | 2017027416 A1 | 2/2017 |

OTHER PUBLICATIONS

English Abstract and Machine Translation for Chinese Publication No. CN1972892A, published May 30, 2007, 42 pgs.

Williams, M. A., "Separation, extraction and concentration process in the food, beverage and nutraceutical industries" with Abstract Woodhead Publishing, Dec. 31, 2013, pp. 418-419.

Toledo, Romeo, "Fundamentals of Food Process Engineering Third Edition", with Abstract Springer, Dec. 31, 2007, pp. 513-516.

Pramparo, M., et al., "Immersion vs. Percolation in the Extraction of Oil from Oleaginous Seeds", Journal of the American Oil Chemist Society, Issue 10, Oct. 31, 2002, pp. 955-960.

* cited by examiner

EXTRACTOR ARRANGEMENT FOR PROCESSING MATERIALS WITH FINES

RELATED APPLICATIONS

This application is a 35 U.S.C. 371 national stage filing from International Application No. PCT/US2016/047861, filed Aug. 19, 2016, which claims priority to U.S. Provisional Application No. 62/208,370, filed Aug. 21, 2015. The entire contents of both these applications are incorporated herein by reference.

TECHNICAL FIELD

This disclosure relates to solvent extraction and, more particularly to liquid-solvent extractors for processing materials with dust and other fines.

BACKGROUND

A variety of different industries use extractors to extract and recover liquid substances entrained within solids. For example, producers of oil from renewable organic sources use extractors to extract oil from oleaginous matter, such as soybeans, rapeseed, sunflower seed, peanuts, cottonseed, palm kernels, and corn germ. The oleaginous matter is contacted with an organic solvent within the extractor, causing the oil to be extracted from a surrounding cellular structure into the organic solvent. As another example, extractors are used to recover oil from oil sands and other petroleum-rich materials. Typically, the petroleum-rich material is ground into small particles and then passed through an extractor to extract the oil from the solid material into a surrounding organic solvent.

During operation, the selected feedstock is passed through the extractor and contacted with a solvent. The solvent can extract oil out of the feedstock to produce an oil deficient solids discharge and a miscella stream. The miscella stream can contain the solvent used for extraction, oil extracted from the feedstock, and other components such as dust and small particulate fines released from the feedstock during processing. Typically, the miscella stream is passed through a distillation column to separate the extracted oil from the solvent, allowing the solvent to be recycled back to the extractor. Before distilling the miscella stream, however, the stream may first be processed to remove dust and other small particulate matter captured by the stream. Because this removed dust and particulate matter may still contain entrained oil, the removed dust and particulate matter may be recycled back to the extractor for further extraction and discharged with the oil deficient solids.

In practice, dust and other particulate matter removed from the miscella stream and recycled back to the extractor may have a tendency to decrease the efficiency of extraction for fresh incoming feedstock. For example, when the particulate matter is recycled back and discharged on top of a bed of feedstock being processed in the extractor, the particulate matter may seal the bed from contact with solvent, reducing extraction efficiency. As another example, when the particulate matter is recycled back to the extractor, the particulate matter may plug drainage screens, pumps, or other flow structures downstream in the extractor. While recycling dust and other particulate matter removed from the miscella stream may not present any operational problems when processing relatively clean feedstock, issues may arise when processing particularly dirty or dusty feedstock.

SUMMARY

In general, this disclosure is directed to devices, systems, and techniques for configuring extractor arrangements for processing feedstock materials containing dust or other fine particulates. In some examples, a system includes a primary extractor and a secondary extractor. The primary extractor is configured to process a main feedstock undergoing extraction, such as an oil-bearing crop or waste material being processed. The secondary extractor is configured to process particulate matter separated from miscella produced from the primary extractor. In some configurations, the secondary extractor is an immersion extractor that has a solvent stream flowing in a counter current direction to a direction which the particulate matter flows through the extractor.

In operation, the primary extractor can generate a miscella stream containing solvent and components extracted from the feedstock being processed by the extractor. The miscella stream may also can contain fine particulate matter (e.g., having a size less than the size of the feedstock particles being processed through the primary extractor), such as dust, dirt, feedstock fragments, or the like. Before distilling the miscella to separate the solvent from the extracted oil, the miscella may first be processed in a separation device to remove the fine particulate matter. This can prevent plugging problems in the downstream distillation column. Using one or more separation devices (e.g., two or more in series), the particulate matter can be separated from the miscella stream to provide a miscella stream having a reduced concentration of fine particulate and a stream containing particulate matter removed from the miscella. The stream containing particulate matter removed from the miscella may contain entrained oil that is both useful for further recovery and that limits direct disposal of the stream.

In some examples, the stream containing particulate matter removed from the miscella produced from the primary extractor can be used as a feedstock for the secondary extractor. For example, the stream containing particulate matter removed from the miscella can be fed through a fed inlet of the secondary extractor while fresh solvent is fed through a solvent inlet of the secondary extractor. Entrained oil carried by the particulate matter removed from the miscella produced from the primary extractor can be extracted in the secondary extractor, producing a secondary miscella stream and a discharge of particulate matter having undergone extraction. In some applications, the feedstock having undergone extraction in the primary extractor is combined with the particulate matter having undergone extraction in the secondary extractor for subsequent processing (e.g., desolventization in a desolventizer-toaster). Similarly, the miscella stream having a reduced concentration of fine particulate from the primary extractor can be combined with the secondary miscella from the second extractor (which may or may not be passed through a separation device itself) for subsequent processing (e.g., separation of solvent from oil in a distillation column).

In one example, an extraction system is described that includes a first extractor, at least one separation device, and a second extractor. The first extractor has a feed inlet, a feed outlet, a solvent inlet, and a solvent outlet. The feed inlet is configured to receive a solid material to be subject to extraction, the feed outlet is configured to discharge a solid material having undergone extraction, the solvent inlet is configured to receive a fresh solvent, and the solvent outlet is configured to discharge a miscella formed via extraction of extractable components from the solid material. The separation device is configured to receive the miscella from the solvent outlet and separate particulate matter from the miscella, thereby forming a miscella stream having a reduced concentration of particulate matter and a particulate stream containing the particulate matter removed from the miscella. The second extractor has a feed inlet, a feed outlet, a solvent inlet, and a solvent outlet. The feed inlet of the second extractor is configured to receive the particulate stream for subsequent extraction, the feed outlet is configured to discharge the particulate stream following extraction, the solvent inlet is configured to receive a fresh solvent, and the solvent outlet is configured to discharge a second miscella formed via extraction of the particulate stream.

The details of one or more examples are set forth in the accompanying drawings and the description below. Other features, objects, and advantages will be apparent from the description and drawings, and from the claims.

DETAILED DESCRIPTION

In general, the disclosure relates to liquid-solid extractor systems and processes that enable the extraction of one or more desired products from solid material flows. In some examples, the solid material is processed in a continuous flow extractor that conveys a continuous flow of material from its inlet to its outlet while a solvent is conveyed in a countercurrent direction from a solvent inlet to a solvent outlet. As the solvent is conveyed from its inlet to its outlet, the concentration of extracted liquid relative to solvent increases from a relatively small extract-to-solvent ratio to a comparatively large extract-to-solvent ratio. Similarly, as the solid material is conveyed in the opposing direction, the concentration of extract in the solid feedstock decreases from a comparatively high concentration at the inlet to a comparatively low concentration at the outlet. The amount of time the solid material remains in contact with the solvent within the extractor (which may also be referred to as residence time) can vary, for example depending on the material being processed and the operating characteristics of the extractor, although will typically be within the range of 15 minutes to 3 hours, such as from 1 hour to 2 hours.

The solvent discharged from the extractor, which may be referred to as a miscella, contains extracted components (e.g., oil) from the solid feedstock and may contain other components, such as dust and small particulate fines released from the feedstock during processing. To remove this particulate matter from the miscella, the miscella may be passed through a separation device that separates the particulate matter from the remaining miscella stream.

In some configurations according to the present disclosure, the particulate matter removed from the miscella stream is processed in a secondary extractor, e.g., to remove residual extracted components (e.g., oil) from the particulate matter. That is, the particulate matter removed from the miscella stream may not be recycled back to the extractor producing the miscella but may instead be delivered to a secondary extractor working cooperatively and synergistically with the extractor producing the original miscella stream. The secondary extractor may be of the different configuration than the main extractor (e.g., immersion or percolation) although sized for smaller throughput than the main extractor. In some examples, the secondary extractor is also a continuous flow extractor that conveys a continuous flow of particulate matter remained from the main extractor from its inlet to its outlet while a solvent is conveyed in a countercurrent direction from a solvent inlet to a solvent outlet. As the solvent is conveyed from its inlet to its outlet, the concentration of extracted liquid relative to solvent increases from a relatively small extract-to-solvent ratio to a comparatively large extract-to-solvent ratio. Similarly, as the particulate matter is conveyed in the opposing direction, the concentration of target extract (e.g., oil) in the particulate matter decreases from a comparatively high concentration at the inlet to a comparatively low concentration at the outlet.

Figure 1:
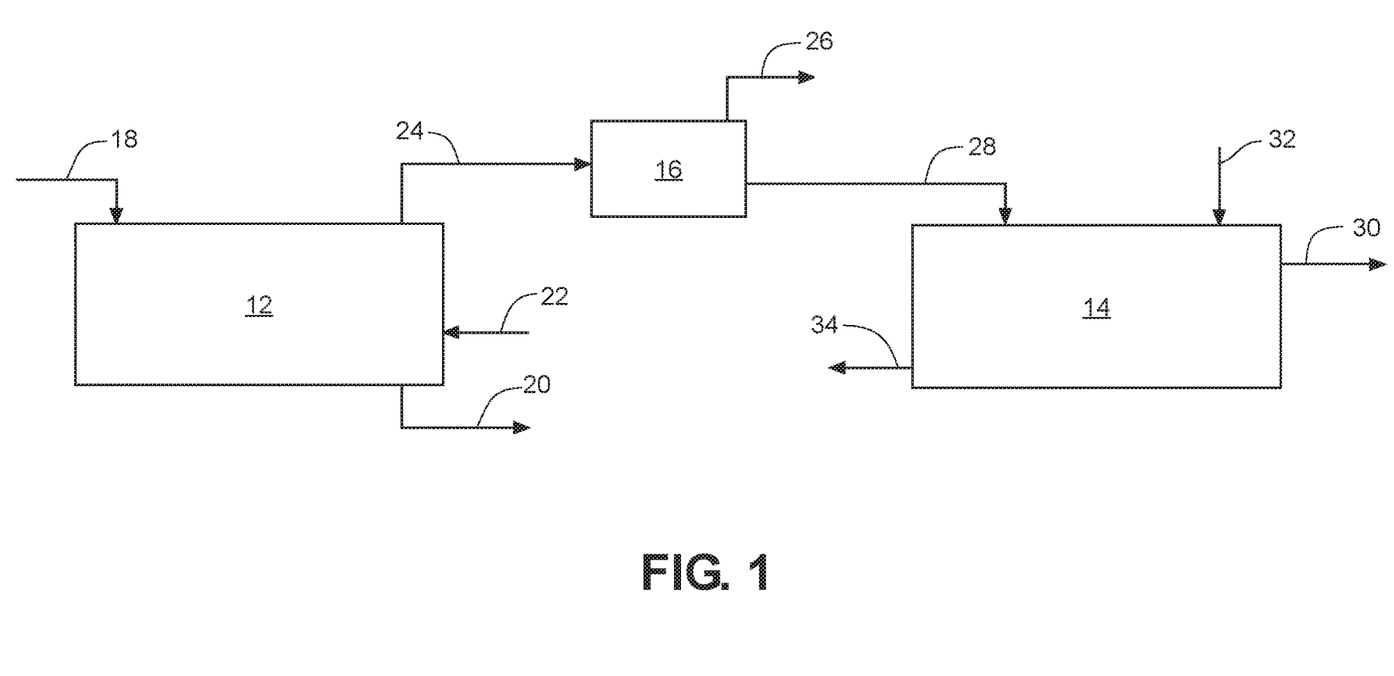
FIG. 1 is a block diagram illustrating an example extractor system according to the disclosure.

FIG. 1 is a block diagram illustrating an example extraction system 10 according to the disclosure. System 10 includes a first extractor 12, a second extractor 14, and a separation device 16. The first extractor 12 has a feed inlet 18 that can receive a solid material to be subject to extraction within the extractor. First extractor 12 also has a feed outlet 20 that can discharge the solid particulate material after it has undergone extraction and has a lower concentration of extract than the fresh incoming material. First extractor 12 also has a solvent inlet 22 configured to introduce fresh solvent into the extractor and a solvent outlet 24 configured to discharge a miscella formed via extraction of extractable components from the solid material.

In operation, the solid material being processed is contacted with solvent within first extractor 12 (e.g., in counter current fashion), causing components soluble within the solvent to be extracted from the solid material into the solvent. First extractor 12 can process any desired solid material using any suitable extraction fluid. Example types of solid material that can be processed using first extractor 12 include, but are not limited to, oleaginous matter, such as soybeans (and/or soy protein concentrate), rapeseed, sunflower seed, peanuts, cottonseed, palm kernels, and corn germ; oil-bearing seeds and fruits; oil-rich materials (e.g., asphalt-containing materials, oil sands); stimulants (e.g., nicotine, caffeine); alfalfa; almond hulls; anchovy meals; bark; coffee beans and/or grounds, carrots; chicken parts; chlorophyll; diatomic pellets; fish meal; hops; oats; pine needles; tar sands; vanilla; and wood chips and/or pulp. Solvents that can be used for extraction from solid material include, but are not limited to a hydrocarbon (e.g., acetone, hexane, toluene), alcohol (e.g., isopropyl alcohol, ethanol, other alcohols), and water.

First extractor 12 can produce a miscella stream that discharges through solvent outlet 24. Because the miscella stream may contain particulate matter released from the solid material processed in the extractor, the miscella stream may pass through a separator device before further processing (e.g., distillation to separate extracted liquids from the solvent). In the example of FIG. 1, system 10 includes separation device 16 that is configured to receive the miscella stream and separate out at least a portion of the particulate matter contained within the miscella stream. Separation device 16 can be implemented using a number of different pieces of separation equipment, such as a hydroclone, a centrifuge, a settling tank, and/or a tent screen. In some examples, multiple separation devices are used in series to increase the removal efficiency of entrained particulate matter from the miscella stream. Separation device 16 (or multiple devices, when used) can produce a miscella stream 26 having a reduced concentration of particulate matter (as compared to the miscella stream discharged from first extractor 12) and stream 28 containing particulate matter separated out of the miscella stream.

In the example of FIG. 1, system 10 includes second extractor 14 that is configured to receive the stream 28 containing particulate matter separated out of the miscella stream and further process the material. Second extractor 14 has a feed inlet that can receive the particulate stream 28 for subsequent extraction within the extractor. Second extractor 14 also has a feed outlet 30 that can discharge particulate matter after it has undergone extraction and has a lower concentration of extract than the fresh particulate matter. Second extractor 14 also has a solvent inlet 32 configured to introduce fresh solvent into the extractor and a solvent outlet 34 is configured to discharge a second miscella formed via extraction of extractable components from the particulate material.

In operation, the particulate matter being processed in second extractor 14 is contacted with solvent within the extractor (e.g., in counter current fashion), causing components soluble within the solvent (e.g., oil) to be extracted from the particulate matter into the solvent. The solvent used in second extractor 14 may be the same as or different than the solvent used in the first extractor 12. In some applications, the solid material having undergone extraction in first extractor 12 and discharged through outlet 22 is combined with the particulate matter having undergone extraction in second extractor 14 through outlet 30 for subsequent processing (e.g., desolventization in a desolventizer-toaster). Similarly, the miscella stream having a reduced concentration of particulate matter 26 from separation device 16 may be combined with the secondary miscella from second extractor 14 (which may or may not be passed through a separation device itself) for subsequent processing (e.g., separation of solvent from oil in a distillation column).

First extractor 12 and second extractor 14 can be implemented using any suitable type of extractor configurations. For example, first extractor 12 and second extractor 14 may each be an immersion extractor, a percolation extractor, or yet other type of extractor design. In one example, first extractor 12 is a shallow bed continuous loop extractor and second extractor 14 is an immersion extractor. Example extractor configurations that can be used for first extractor 12 and second extractor 14 are described in greater detail with respect to FIGS. 2 and 3.

Figure 2:
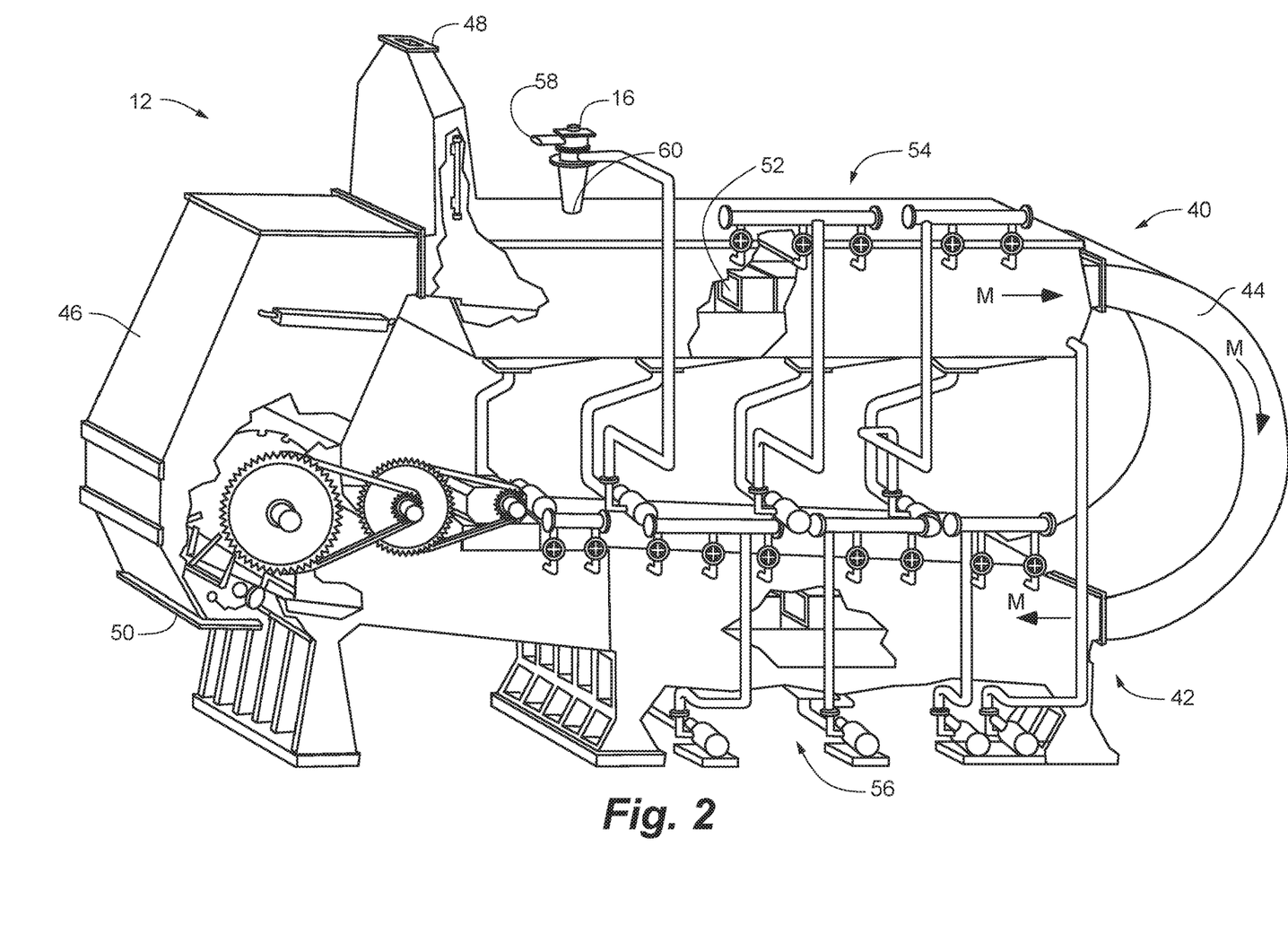
FIG. 2 is an illustration of an example extractor configuration that can be used in the system of FIG. 1.

FIG. 2 is an illustration of an example extractor configuration that can be used for first extractor 12. In the example shown, extractor 12 includes a housing defining a passageway in the form of a loop disposed in a vertical plane. The extractor can include upper and lower extraction sections 40, 42 each with a series of extraction chambers, a generally arcuate hollow transfer section 44 having its opposite upper and lower ends connected to first ends of the upper and lower extraction sections respectively, and a hollow, generally vertical return section 46 connected at its upper and lower ends respectively to the other ends of the upper and lower extraction sections. The upper extraction section can include an inlet portion 48 for delivery of solid material to the interior thereof in closely spaced relation to the upper end of the return section, and the lower end of the return section can define an opening 50 for discharge of the material after the product-of-interest has been extracted therefrom. The number of extraction chambers, or stages, provided by the extractor can vary depending on the desired sized of the extractor. The extractor includes at least one extraction chamber, or stage, and typically includes multiple stages (e.g., 6 stages, 8 stages, or more). A Model III extractor commercially available from Crown Iron Works Company of Minneapolis, Minn., is a specific example of an extractor of this type.

In such an extractor, a conveyor system 52 can extend longitudinally through the looped passageway and be driven in a material flow direction "M" to move the material as a bed from the inlet portion 48 through the upper extraction section 40 toward and downwardly through the transfer section 44, and through the lower extraction section 42 toward the lower end of the return section and the discharge opening 50. In some embodiments, the conveyor system includes a pair of laterally spaced endless link chains and a plurality of longitudinally spaced flights that extend transversely of the chains. A motor and gearing may be provided to drive the conveyor.

In some configurations, a fluid supply system 54 can be disposed above the solid materials and configured to apply a fluid to the solid materials in each extraction chamber, and a fluid removal system 56 can be disposed below the solid materials and configured for removing the fluid after it has passed through the solid materials in each extraction chamber. In some embodiments, the fluid supply system and the fluid removal system are in fluid communication via various recycle streams and the like. The fluid supply system may include a network of spray headers, pumps, and pipes to apply the fluid in each extraction chamber. The fluid supply system can apply (e.g., spray) the extraction fluid on top of the conveyed solid material, allowing the extraction fluid to then percolate through the material. The fluid removal system may include a network of drains, pumps, and pipes to collect the fluid after it has percolated through the solid material in each extraction chamber and deliver it to the fluid supply system of another extraction chamber or remove it from the system.

As shown in FIG. 2, fluid having passed through the solid material is collected by the fluid removal system 56 and delivered to separation device 16, which in the illustrated example is shown as a cyclone-type separator to separate any solid fines from the fluid before fluid discharge. An outlet conduit 58 of separation device 16 can deliver the fluid, generally a mixture of extraction fluid and soluble components extracted from the solid material into the extraction fluid (e.g., oil when processing oil seed) (commonly known as "miscella"), to other equipment, not shown, for separating the extraction fluid from the material extracted from the solid material being processed. A separate outlet 60 of separation device 16 can deliver a stream containing particulate matter separated from the miscella for further processing, as described herein.

As material is conveyed through first extractor 12, spray headers from the fluid supply system 54 spray recycled extraction fluid on the top of the material. The material percolates through the material and through the screen, where it is collected in the network of drain pipes and delivered back to the network of spray headers where it is reapplied to the solid material in a different extraction chamber. In some embodiments, fresh extraction fluid is applied to the material in the last extraction chamber before the solid material discharge opening 50. For example, fresh extraction fluid may be applied to the material in the last extraction chamber before discharge 50 and, after being collected at the bottom of the chamber, recycled and applied on top of solid material in an adjacent upstream extraction chamber. By recycling collected extraction fluid from one extraction chamber to an adjacent upstream extraction chamber, liquid extraction fluid and solid material being processed can move in countercurrent directions through the extractor. For example, as extraction fluid is conveyed sequentially through adjacent extraction chambers between a fresh extraction fluid inlet adjacent discharge 50 and an enriched extraction fluid outlet adjacent inlet 48, the concentration of extract relative to extraction fluid increases from a relatively small extract-to-extraction fluid ratio to a comparatively large extract-to-extraction fluid ratio. Similarly, as the solid material is conveyed in the opposing direction, the concentration of extract in the solid feedstock decreases from a comparatively high concentration at the inlet 48 to a comparatively low concentration at the outlet 60.

Figure 3:
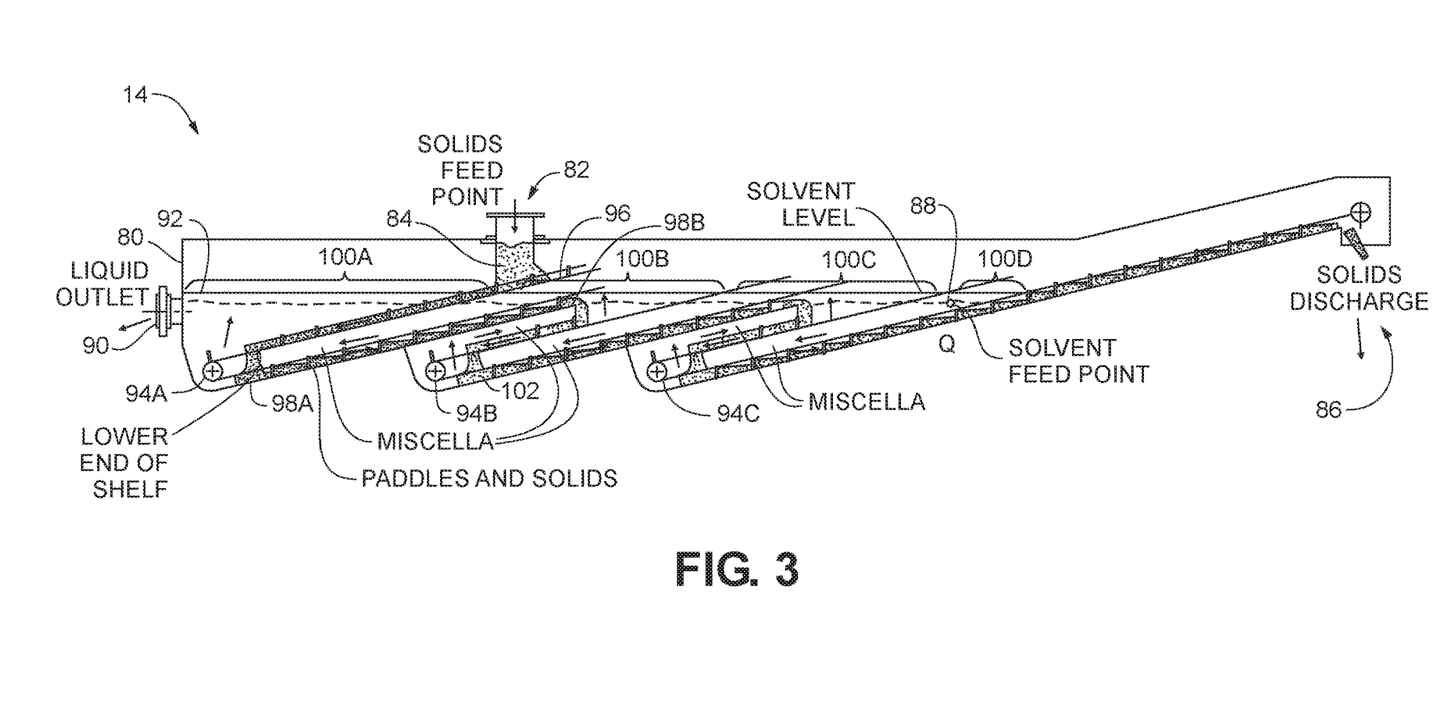
FIG. 3 is an illustration of another example extractor configuration that can be used in the system of FIG. 1.

As mentioned above, separation device 16 can produce a stream containing particulate matter separated from miscella through outlet 60 for further processing. FIG. 3 is an illustration of an example configuration of second extractor 14 that can receive and process the stream containing the particulate matter separated from the miscella produced using first extractor 12. As shown in this example, second extractor 14 includes a housing 80 containing one or more extraction stages through which a material being processed travels in a countercurrent direction with an extraction solvent. Housing 80 includes a feed inlet 82 configured to receive a continuous flow of particulate material 84 separated from the miscella produced from first extractor 12. Second extractor 14 also includes a feed outlet 86 configured to discharge the particulate material 84 after some or all of the extract has been extracted into solvent flowing through the extractor.

To provide a flow of solvent passing through second extractor 14, housing 80 also includes a solvent inlet 88 that receives solvent devoid of extract or having a comparatively low concentration of extract. A solvent outlet 90 is provided on a generally opposite end of housing 80 to discharge solvent having passed through extractor 14. As solvent travels through housing 80 from inlet 88 to outlet 90, the solvent flows in a countercurrent direction from the flow of particulate material 84 passing through the extractor. The solvent intermixes with particulate material 84 within extractor 14, causing the extract carried by the solids material to transfer from the solids material to the solvent. Accordingly, in operation, solvent having a comparatively low concentration of extract enters at inlet 88 while solvent having an increased concentration of extract discharges at outlet 90. Likewise, fresh particulate material 84 carrying extract (e.g., oil) enters at inlet 82 while processed particulate material having a reduced concentration of extract is discharged at outlet 86. For example, in instances where particulate material 84 is an oil-bearing material, solvent can extract oil out of the particulate material forming a second miscella (the solution of oil in the extraction solvent) that is discharged through outlet 90.

Extractor 14 can be operated as an immersion extractor in which a pool or reservoir of solvent 92 is maintained in housing 80 to provide a desired solvent level inside the extractor. In such applications, particulate material 84 is immersed (e.g., submerged) in the pool of solvent 92 as it moves through extractor 14. In some examples, particulate material 84 remains completely submerged in the pool of solvent 92 as it travels through extractor 14, e.g., except when adjacent inlet 82 and outlet 86. In other examples, particulate material 84 travels above the pool of solvent 92 at different stages in extractor 14 before falling off the end of a conveyor and dropping back into the pool of solvent. As one example, extractor 14 may be implemented using a Model IV extractor commercially available from Crown Iron Works Company of Minneapolis, Minn.

To contact particulate material 84 with solvent inside of extractor 14, the extractor has one or more conveyors that convey the material in a countercurrent direction through the pool of solvent 92. In the configuration of FIG. 3, for instance, extractor 14 has three conveyors 94A, 94B, 94C that convey particulate material 84 through the solvent pool 92 contained within housing 80. Particulate material 84 can travel along decks or trays 96 positioned inside of extractor 14 to define a bed of material. Each bed deck 96 may define a receiving end 98A and a discharge end 98B. In operation, particulate material 84 can drop onto the receiving end 98A of the bed deck 96 and then be conveyed along the bed deck by the conveyor until reaching the discharge end 98B. Upon reaching discharge end 98B, particulate material 84 can drop off or fall over the terminal edge of the bed deck, for example, onto a lower bed deck.

The vertical distance separating the discharge end 98B of an upper bed deck 96 from a receiving end 98A of a lower bed deck may provide a mixing or drop zone 102 through which particulate material 84 travels. For example, particulate material 84 dropping off the discharge end 98B of an upper bed deck 96 can mix and interact with solvent located between the upper bed deck and a lower bed deck in drop zone 102, e.g., as the solids material falls under the force of gravity toward the lower bed deck. A desired extract carried by the particulate material 84 can be extracted into the solvent within this drop zone as the solids material intermixes with the solvent within the drop zone. Increasing the number of bed decks 98 within extractor 14 and, correspondingly, the number of drop zones between bed decks, can increase the amount of extract recovered from a specific particulate material 84 being processed on the extractor.

Extractor 14 can have any suitable number of bed decks 96 arranged in any desired orientation. In the example, of FIG. 3, extractor 14 is illustrated as having six bed decks 96, although the extractor can have fewer bed decks or more bed decks. In addition, in this example, bed decks 96 are arranged at an inclined angle such that the bed decks are alternatingly sloped downwardly and upwardly. Bed decks 96 may be arranged in series with adjacent bed decks being vertically and/or laterally offset from one another to provide adjacent flow pathways over which particulate material 84 travels when passing through extractor 14. For example, bed decks 96 may be arranged in parallel to define a serpentine pathway along which particulate material 84 is conveyed through pool of solvent 92 between inlet 82 and outlet 86. In operation, particulate material 84 may travel along a downwardly sloped bed deck 96 before dropping onto an upwardly sloped lower bed deck, at which point the solids material reverses direction and travels laterally and vertically in an opposed direction from the direction of travel on the upper bed deck.

In the example of FIG. 3, particulate material 84 enters extractor 14 via inlet 82 and falls onto a first downwardly sloped bed deck. Conveyor 94A moves particulate material 84 from the receiving end of the first downwardly sloped bed deck to the discharge end of the first downwardly sloped bed deck, whereupon the solids material drops off of the deck through a first drop zone onto a first upwardly sloped bed deck. Conveyor 94A moves particulate material 84 from the receiving end of this first upwardly sloped bed deck to the discharge end of this bed deck, whereupon the solids material drops off of the deck through a second drop zone onto a second downwardly sloped bed deck. Conveyor 94B moves particulate material 84 from the receiving end of the second downwardly sloped bed deck to the discharge end of this bed deck, whereupon the solids material drops off of the deck through a third drop zone onto a second upwardly sloped bed deck. Conveyor 94B moves particulate material 84 from the receiving end of this second upwardly sloped bed deck to the discharge end of the bed deck, whereupon the solids material drops off of the deck through a third drop zone onto a third downwardly sloped bed deck. Conveyor 94C moves particulate material 84 from the receiving end of the third downwardly sloped bed deck to the discharge end of this bed deck, whereupon the solids material drops off of the deck through a fourth drop zone onto a third upwardly sloped bed deck. Finally, conveyor 94C moves particulate material 84 along this final bed deck out of the solvent pool 92 and discharges the processed solids material via outlet 18.

In some examples, the pool of solvent 92 contained within housing 80 is divided into fluidly interconnected sub-pools, e.g., to provide different equilibrium extraction stages. For example, bed decks 96 may provide physical barriers that separate each sub-pool from each adjacent sub-pool and prevent solvent from flowing through the bed deck. In such examples, solvent may flow around the discharge end 98B of each bed deck rather than through the bed deck, allowing the solvent to flow in a countercurrent direction from particulate material 84 through extractor 14. Other physical divider structures in addition to or in lieu of bed decks 96 can be used to separate the pool of solvent 92 in different sections.

In the example of FIG. 3, extractor 14 is illustrated as having four solvent pools 100A-100D. Each downwardly sloping bed deck 96 provides a barrier between adjacent pools with adjacent solvent pools being connected at the discharge end of a separating bed deck. In operation, each solvent pool of pools 100A-100D may have a different average extract-to-solvent concentration ratio to provide different stages of extraction. The concentration ratio may progressively increase from a lowest concentration adjacent solvent inlet 88 to a highest concentration adjacent solvent or second miscella outlet 90.

Particulate material 84 processed in extractor 14 is conveyed out of solvent pool 92 and discharged through outlet 86 via a conveyor. In the configuration of FIG. 3, for instance, conveyor 94C conveys particulate material 84 out of solvent pool 92 towards outlet 86. Residual solvent retained by processed particulate material 84 can drain under the force of gravity back into solvent pool 92. For this reason, the final bed deck or discharge deck 96 along which particulate material 84 travels towards outlet 86 may be sloped upwardly away from solvent pool 92. Solvent carried with particulate material 84 out of solvent pool may drain down the sloped bed deck back into the solvent pool, helping to minimize the amount of solvent carried out extractor 14 by the processed solids material being discharged from the extractor.

After being processed on second extractor 14, residual particulate matter 84 discharging through outlet 86 may or may not be combined with feedstock discharging from outlet 50 of first extractor 12 (FIG. 2). These discard streams, either alone or in combination, can be further processed, for example subject to desolventization in a desolventizer-toaster. Similarly, the cleaned miscella stream discharged through outlet 58 of separation device 16 (FIG. 2) may or may not be combined with the second miscella stream discharging from solvent outlet 90 of second extractor 14. In some examples, the second miscella stream is passed through a separation device before being combined with the cleaned miscella from the first extractor. In either case, the miscella streams, either alone or in combination, can be further processed, for example, by distilling the streams to separate the solvent from the extract (e.g., oil).

Figure 4:
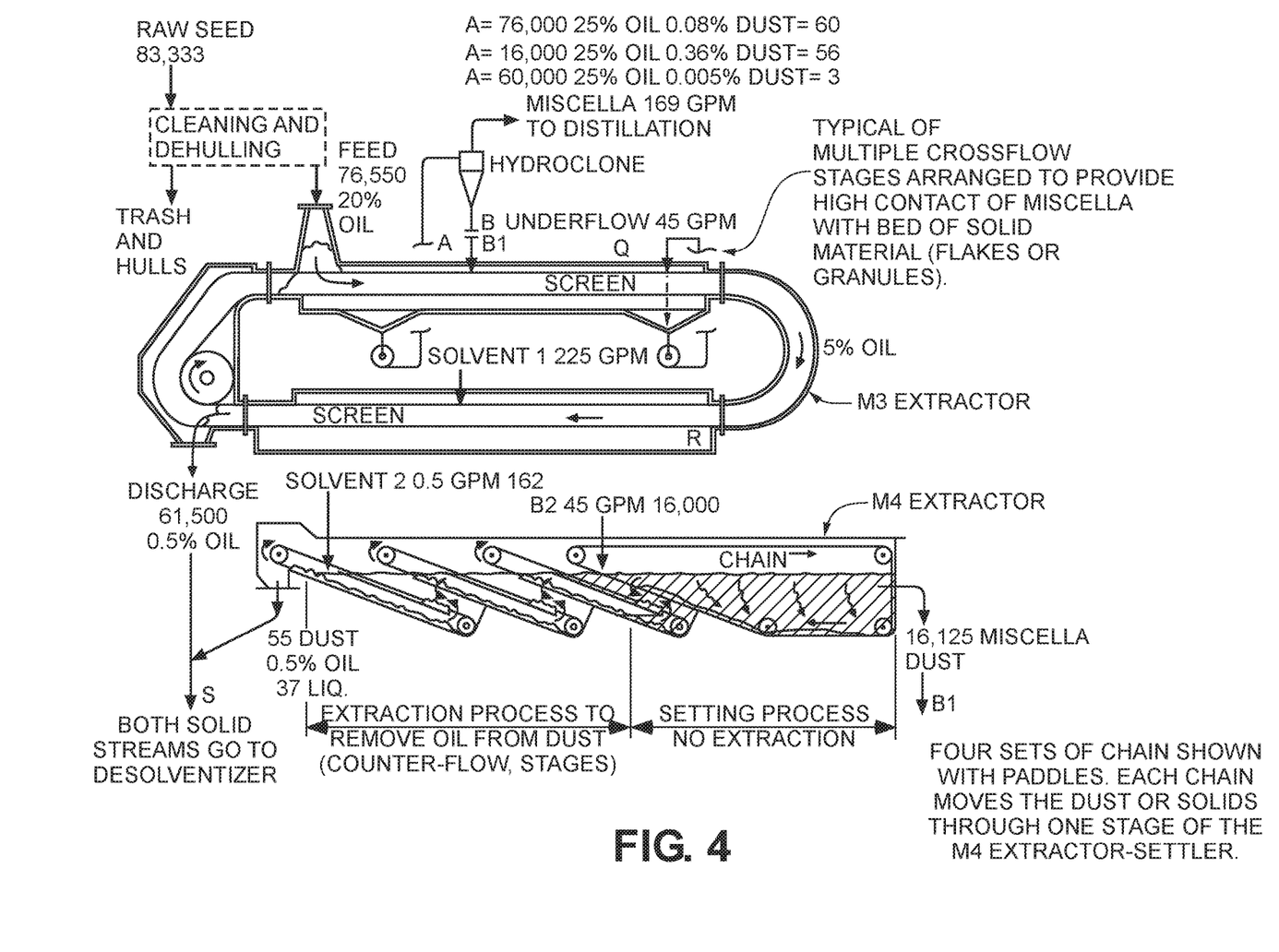
FIG. 4 is a diagram illustrating an example implementation of a system in accordance with the disclosure.

FIG. 4 is a diagram illustrating an example implementation of a system in accordance with the disclosure. The figure includes exemplary flow rates (in pounds per hour unless otherwise noted) and exemplary extract concentrations (in weight percent unless otherwise noted). While FIG. 4 illustrates one example configuration, it should be appreciated that the configuration is for purposes of illustration and the disclosure is not limited in this respect.

Various examples have been described. These and other examples are within the scope of the following claims.

The invention claimed is:

1. An extraction system comprising:
   a first extractor having a feed inlet, a feed outlet, a solvent inlet, and a solvent outlet, wherein the feed inlet is configured to receive a solid material to be subject to extraction, the feed outlet is configured to discharge a solid material having undergone extraction, the solvent inlet is configured to receive a fresh solvent, and the solvent outlet is configured to discharge a miscella formed via extraction of extractable components from the solid material;
   a desolventizing device configured to receive solid material having undergone extraction from the feed outlet of the first extractor and remove solvent from the solid material having undergone extraction to produce a desolventized solid material;
   at least one separation device configured to receive the miscella from the solvent outlet and separate particulate matter from the miscella, thereby forming a miscella stream having a reduced concentration of particulate matter and a particulate stream containing the particulate matter removed from the miscella; and
   a second extractor having a feed inlet, a feed outlet, a solvent inlet, and a solvent outlet, wherein the feed inlet is configured to receive the particulate stream for subsequent extraction, the feed outlet is configured to discharge the particulate stream following extraction, the solvent inlet is configured to receive a fresh solvent, and the solvent outlet is configured to discharge a second miscella formed via extraction of the particulate stream.

2. The system of claim 1, wherein the second extractor comprises an immersion extractor.

3. The system of claim 1, wherein the second extractor is configured such that solvent flows in a counter current direction to a direction that the particulate stream flows through the second extractor.

4. The system of claim 1, wherein the second extractor comprises:
   a housing configured to maintain a solvent pool in which the particulate material being processed is immersed during operation of the second extractor;
   at least one bed deck positioned inside the housing and providing a surface along which the particulate material is conveyed during operation of the second extractor; and
   a conveyor configured to move the particulate matter along the at least one bed deck.

5. The system of claim 4, wherein the at least one bed deck comprises a plurality of bed decks positioned adjacent to each other along the length of the housing, the feed inlet is configured to discharge the particulate matter on a first of the plurality of the bed decks, and the feed outlet is positioned following a final bed deck that extends from below a solvent level maintained in the housing to above the solvent level, allowing the particulate stream to be conveyed along the final bed deck out of the solvent pool and toward the feed outlet.

6. The system of claim 1, wherein the particulate stream discharged from the feed outlet of the second extractor is configured to combine with the solid material having undergone extraction and discharged from the feed outlet of the first extractor.

7. The system of claim 1, wherein the first extractor comprises one of an immersion extractor and a percolation extractor.

8. The system of claim 1, wherein the first extractor comprises a continuous loop extractor.

9. The system of claim 1, wherein the at least one separation device comprises at least one of a hydroclone, a centrifuge, a settling tank, and a tent screen.

10. The system of claim 1, wherein the at least one separation device comprises multiple separation devices arranged in series.

11. The system of claim 1, wherein the first extractor is a percolation extractor and the second extractor is an immersion extractor.

12. The system of claim 1, wherein:
the solvent inlet of the first extractor is configured to receive a first solvent;
the solvent inlet of the second extractor is configured to receive a second solvent; and
the first solvent is a same solvent as the second solvent.

13. The system of claim 1, wherein:
the solvent inlet of the first extractor is configured to receive a first solvent;
the solvent inlet of the second extractor is configured to receive a second solvent; and
the first solvent is different than the second solvent.

14. The system of claim 1, wherein the desolventizing device is further configured to receive the particulate stream following extraction from the feed outlet of the second extractor and to remove solvent from the particulate stream to produce the desolventized solid material.

15. The system of claim 1, further comprising a distillation device configured to receive the miscella stream having the reduced concentration of particulate matter from the at least one separation device and to distill the miscella stream having the reduced concentration of particulate matter to separate oil from solvent.

16. The system of claim 15, wherein the distillation device is further configured to receive the second miscella from the second extractor and to distill the second miscella stream to separate oil from solvent.

* * * * *